(12) United States Patent
Zhang et al.

(10) Patent No.: US 12,655,022 B2
(45) Date of Patent: Jun. 16, 2026

(54) METHOD AND DEVICE FOR WASHING AND PURIFICATION WITH LOW-TEMPERATURE METHANOL

(71) Applicant: Dalian Jiachun Gas Purification Technology Development Co., Ltd, Dalian (CN)

(72) Inventors: Shuwei Zhang, Dalian (CN); Fengbao Guan, Dalian (CN)

(73) Assignee: Dalian Jiachun Gas Purification Technology Development Co., Ltd, Dalian (CN)

( * ) Notice: Subject to any disclaimer, the term of this patent is extended or adjusted under 35 U.S.C. 154(b) by 462 days.

(21) Appl. No.: 18/091,418

(22) Filed: Dec. 30, 2022

(65) Prior Publication Data

US 2024/0216854 A1    Jul. 4, 2024

(51) Int. Cl.
    *C01B 3/52*        (2006.01)
    *B01D 5/00*        (2006.01)
        (Continued)

(52) U.S. Cl.
    CPC .............. *C01B 3/52* (2013.01); *B01D 5/0003* (2013.01); *B01D 5/0069* (2013.01); *B01D 47/14* (2013.01); *B01D 53/1406* (2013.01); *B01D 53/1493* (2013.01); *B01D 53/52* (2013.01); *B01D 53/526* (2013.01); *B01D 53/002* (2013.01);
        (Continued)

(58) Field of Classification Search
    None
    See application file for complete search history.

(56) References Cited

U.S. PATENT DOCUMENTS 7,744,751 B2    6/2010    Herling et al.
2009/0101007 A1*    4/2009    Find ...................... F25J 3/0266
                                                        95/42

FOREIGN PATENT DOCUMENTS

CN            1377825 A        11/2002
CN        203639434 U          6/2014
            (Continued)

OTHER PUBLICATIONS

CN106403499A_ENG (Espacenet machine translation of Gong) (Year: 2017).*

*Primary Examiner* — Gabriel E Gitman
(74) *Attorney, Agent, or Firm* — Bayramoglu Law Offices LLC

(57)        ABSTRACT

A method for washing and purification with a low-temperature methanol at least includes the following steps: condensing a raw shift gas and conducting a gas-liquid separation to obtain $CO_2$-containing liquid and a separated raw material gas; and vaporizing the $CO_2$-containing liquid and reducing a pressure by an expansion to obtain a $CO_2$-containing gas; and washing the separated raw material gas with a methanol to obtain a purified gas. The present application combines $CO_2$ condensation and an expander, so that the load of cooling capacity of the system for washing with a low-temperature methanol is reduced by 60%. At the same time, the external work done by the expander reduces the energy consumption of the system. After the $CO_2$ in the purifying gas of desulfurization in the section A of the scrubber is condensed, the amount of $CO_2$ entering the section B is reduced.

3 Claims, 2 Drawing Sheets

(51) Int. Cl.

| | | |
|---|---|---|
| *B01D 47/14* | (2006.01) | |
| *B01D 53/14* | (2006.01) | |
| *B01D 53/52* | (2006.01) | |
| *B01D 53/00* | (2006.01) | |
| *F25J 3/06* | (2006.01) | |

(52) U.S. Cl.

CPC ...... *B01D 53/1425* (2013.01); *B01D 53/1468* (2013.01); *B01D 53/1487* (2013.01); *B01D 2252/2021* (2013.01); *B01D 2257/30* (2013.01); *B01D 2257/304* (2013.01); *F25J 3/0655* (2013.01); *F25J 3/067* (2013.01)

(56) References Cited

FOREIGN PATENT DOCUMENTS

| | | | | | | |
|---|---|---|---|---|---|---|
| CN | 204211704 | U | | 3/2015 | | |
| CN | 105523524 | A | | 4/2016 | | |
| CN | 106403499 | A | * | 2/2017 | ............. | C10L 3/104 |
| CN | 108977236 | A | | 12/2018 | | |
| CN | 208911769 | U | | 5/2019 | | |
| CN | 210584343 | U | | 5/2020 | | |
| CN | 212395910 | U | | 1/2021 | | |
| DE | 102016002616 | A1 | | 9/2017 | | |
| EP | 2939722 | A1 | | 11/2015 | | |

* cited by examiner

METHOD AND DEVICE FOR WASHING AND PURIFICATION WITH LOW-TEMPERATURE METHANOL

TECHNICAL FIELD

The application relates to a method and a device for washing and purification with a low-temperature methanol and belongs to the technical field of chemical gas washing.

BACKGROUND

The purification process of washing gas with a low-temperature methanol is a physical absorption method jointly developed by the German Linde Group and Lurgi Company in the 1950s to remove acid gases in the gas. Because it can remove $H_2S$, COS, HCN, $CO_2$, and other components as well as water in the gas, it has the advantages of a high purification degree, good absorption selectivity, and integrates the relatively good thermal and chemical stabilities of methanol, etc. Since its development, the method has been widely applied to devices used for hydrogen production, ammonia production, methanol production, natural-gas processing, etc.

The washing process with a low-temperature methanol uses low-temperature methanol to absorb carbon dioxide and hydrogen sulfide in raw shift gas to obtain purified gas as a product. The methanol absorbing acid gases such as carbon dioxide and hydrogen sulfide is regenerated by reducing pressure, nitrogen stripping, and heating. During the recovery, some pure carbon dioxide and some nitrogen-containing carbon dioxide tail gas are obtained. In addition, an acid gas obtained by enriching hydrogen sulfide is delivered to a downstream sulfur recovery unit.

The content of carbon dioxide in the raw shift gas is about 32 mol %-45 mol %. The current purification process of washing gas with a low-temperature methanol usually requires a large amount of methanol as a solvent to circulate so as to wash the large amount of carbon dioxide in the raw shift gas. Therefore, the load of cooling capacity of the system is high, and the energy consumption is relatively large.

SUMMARY

To solve the above problems, the present disclosure provides a method and a device for washing and purification with a low-temperature methanol. By combining $CO_2$ condensation and an expander, the system using a low-temperature methanol to wash greatly reduces the load of cooling capacity.

In order to achieve the above object, the present disclosure provides the following technical solution:

The present application provides a method for washing and purification with a low-temperature methanol. The method at least includes the following steps:

condensing a raw shift gas and conducting a gas-liquid separation to obtain $CO_2$-containing liquid and a separated raw material gas; and vaporizing the $CO_2$-containing liquid and reducing a pressure by an expansion to obtain a $CO_2$-containing gas; and washing the separated raw material gas with a methanol to obtain a purified gas.

Optionally, the vaporizing the $CO_2$-containing liquid and reducing the pressure by the expansion includes:

a. after the reducing the pressure, flashing the liquid $CO_2$ to obtain an effective gas, where the effective gas is compressed and returns to the raw shift gas;

b. evaporating the flashed liquid phase to obtain a $CO_2$-containing medium pressure gas; and c. delivering the $CO_2$-containing medium pressure gas into the expander and reducing the pressure by the expansion to obtain a low-pressure $CO_2$-containing gas.

Specifically, the $CO_2$ gas obtained from the step c is a low-temperature low-pressure $CO_2$ gas, where the low temperature refers to $-50°$ C. to $-60°$ C., and the low pressure refers to 0.35 MPa to 0.40 MPa.

Optionally, before delivering the $CO_2$-containing medium pressure gas into the expander, the step c further includes:

performing a heat exchange and a heating to the medium-pressure $CO_2$-containing gas.

Optionally, the method further includes conducting a desulfurization treatment to the raw shift gas before condensing the raw shift gas and conducting the gas-liquid separation.

Optionally, the desulfurization treatment includes:

cooling and separating the raw shift gas and separating methanol and water in the raw shift gas to obtain the shift gas; delivering the shift gas into the scrubber; and desulfurizing the shift gas with a sulfur-free rich methanol.

Optionally, after the $CO_2$-containing gas is heat-exchanged, the $CO_2$-containing gas is mixed with the $CO_2$ gas obtained from a recovery system as a $CO_2$ product gas, and the $CO_2$ product gas is sent out of a boundary area.

Preferably, after the $CO_2$-containing gas is heated by the heat exchange, the $CO_2$-containing gas is mixed with the $CO_2$ gas obtained from the recovery system and heated again as a $CO_2$ product gas and then is sent out of the boundary area.

Optionally, the method further includes:

desulfurizing the $CO_2$-containing gas.

Optionally, the desulfurizing includes:

delivering the $CO_2$-containing gas into a $CO_2$ desorption tower of the recovery system for desulfurization; after the desulfurized $CO_2$ gas is heat-exchanged, the desulfurized $CO_2$ gas serves as a $CO_2$ product gas and then is sent out of the boundary area.

Specifically, the $CO_2$-containing gas is delivered into a $CO_2$ desorption tower of the recovery system to be desulfurized along with the $CO_2$ gas in the $CO_2$ desorption tower. After being heat-exchanged, the desulfurized $CO_2$ gas serves as a $CO_2$ product gas and then is sent out of the boundary area.

In a second aspect of the present application, a device for washing and purification with a low-temperature methanol is provided. The device at least includes a heat exchange condensing device, a $CO_2$ condensate separator, an expander, and a scrubber.

A feed port of the $CO_2$ condensate separator is connected to a raw material gas pipeline, and the heat exchange condensing device is provided on the raw material gas pipeline.

A gas outlet of the $CO_2$ condensate separator is connected to the scrubber through a pipeline.

A liquid outlet of the $CO_2$ condensate separator is connected to the heat exchange condensing device and the expander sequentially through pipelines.

A gas outlet of the scrubber is connected to a purified gas pipeline. The scrubber is used to wash the gas separated by the $CO_2$ condensate separator.

Optionally, the heat exchange condensing device includes a purifying gas condenser, a $CO_2$ condensate evaporator, and a purified gas cryogenic device.

The raw material gas pipeline is respectively connected to a heating chamber of the purifying gas condenser and a heating chamber of the $CO_2$ condensate evaporator.

The purifying gas condenser and the feed port of the $CO_2$ condensate separator are connected through a pipeline.

The heating chamber of the $CO_2$ condensate evaporator is connected to the feed port of the $CO_2$ condensate separator through a pipeline, and the purified gas cryogenic device is provided on the pipeline.

The liquid outlet of the $CO_2$ condensate separator is connected to an evaporation chamber of the $CO_2$ condensate evaporator and an inlet of the expander through pipelines in sequence.

An outlet of the expander is connected to a carbon dioxide product gas pipeline through the purifying gas condenser.

Optionally, the raw material gas pipeline is provided with a shift gas condenser and a shift gas separator in sequence along a direction of a gas flow.

The shift gas condenser is used to cool the raw shift gas.

The shift gas separator is used to separate methanol and water in the cooled raw shift gas.

The gas outlet of the shift gas separator is connected to the scrubber through a pipeline, or the gas outlet of the shift gas separator is respectively connected to the purifying gas condenser and the $CO_2$ condensate evaporator through pipelines.

The liquid outlet of the shift gas separator is connected to the recovery system through a pipeline.

The shift gas condenser is respectively located on the pipeline between the $CO_2$ condensate separator and the expander, on a carbon dioxide product gas pipeline, and on a purified gas pipeline.

Preferably, the shift gas condenser is also located on a tail gas pipeline.

Optionally, the scrubber includes a section A and a section B from bottom to top.

The section A of the scrubber is used to wash the gas separated by the $CO_2$ condensate separator.

The section B of the scrubber is used to desulfurize the raw shift gas.

A lower part of the section A of the scrubber is connected to the gas outlet of the shift gas separator through a pipeline.

An upper part of the section A of the scrubber is respectively connected to the heating chamber of the purifying gas condenser and the heating chamber of the $CO_2$ condensate evaporator through pipelines.

A lower part of the section B of the scrubber is connected to the gas outlet of the $CO_2$ condensate separator through a pipeline.

The gas outlet at a top of the section B of the scrubber is connected to the purified gas pipeline.

Optionally, the outlet of the expander is connected to a feed port of the $CO_2$ desorption tower of the recovery system via the purifying gas condenser through a pipeline.

A discharge port of the $CO_2$ desorption tower is connected to the carbon dioxide product gas pipeline through the shift gas condenser.

Optionally, the device further includes a flash tank.

A liquid inlet of the flash tank is connected to the liquid outlet of the $CO_2$ condensate separator through a pipeline.

A gas outlet of the flash tank is connected to the raw material gas pipeline.

A liquid outlet of the flash tank is connected to the evaporation chamber of the $CO_2$ condensate evaporator through a pipeline.

Optionally, a compressor is provided on the pipeline connecting the flash tank and the raw material gas pipeline.

The reason why the method provided by the present disclosure can reduce the load of cooling capacity is that: a) After the $CO_2$ in raw shift gas is condensed, the $CO_2$ that needs to be absorbed by methanol in the section B of the scrubber is reduced. Thus, the amount of total methanol required is reduced. The load of cooling capacity of the whole system is reduced. At the same time, the consumption of the recovery system is also reduced. b) $CO_2$ gas is decompressed and expanded by the expander to obtain low-pressure, low-temperature $CO_2$ gas, and the cooling capacity of the low-temperature $CO_2$ gas can reduce the demand for external cooling capacity of the device after recovery.

In the present disclosure, an "effective gas" refers to gases flashed by the flash tank, e.g. $H_2$; a "raw material gas pipeline" refers to the pipeline where the raw shift gas resides before entering the scrubber; a "carbon dioxide product gas pipeline" refers to the pipeline that exists before $CO_2$ enters a $CO_2$ product gas collection equipment and after the heat exchange in the purifying gas condenser of desulfurization; a "purified gas pipeline" refers to the pipeline through which the purified raw material gas passes after coming out of the top of the section B of the scrubber; a "tail gas pipeline" refers to the pipeline through which tail gases discharged from the methanol recovery system passes.

The beneficial effects of the present application include:

1) The method for washing and purification with a low-temperature methanol provided by the present disclosure reduces the load of cooling capacity of the system for washing with a low-temperature methanol by 60% through combining $CO_2$ condensation and an expander. At the same time, the external work done by the expander reduces the energy consumption of the system.

2) In the method for washing and purification with a low-temperature methanol provided by the present disclosure, after the $CO_2$ in the purifying gas of desulfurization in the section A of the scrubber is condensed, the amount of $CO_2$ entering the section B is reduced. Thus, the circulation amount of lean methanol is reduced, and the power consumption is also reduced. Therefore, the consumption of the recovery system and the investment are greatly reduced.

3) The method for washing and purification with a low-temperature methanol provided by the present disclosure reduces the liquid-phase loading of the section B of the scrubber, thereby reducing the diameter of the scrubber and the investment costs.

REFERENCE NUMERALS

T-101: scrubber; E-101: shift gas condenser; E-102: purifying gas condenser; E-103: $CO_2$ condensate evaporator; E-104: purified gas cryogenic device; V-101: shift gas separator; V-102: $CO_2$ condensate separator; V-103: flash tank; G-101: expander; and K-101; compressor.

1: shift gas; 2: tail gas; 3: $CO_2$ product gas; 4: purified gas; 5: separated shift gas; 6: methanol and water; 7: desulfurized purified gas; 7-1: sulfur-containing $CO_2$ gas; 8: sulfur-containing rich methanol; 9: sulfur-free rich methanol for reflux; 10: sulfur-free rich methanol; 11: $CO_2$ condensate; 12: purified gas after liquid separation; 13: medium-pressure $CO_2$ gas; 14: condensate after flash; 15: circulated gas; 16: lean methanol; and 17: spray lean methanol.

DETAILED DESCRIPTION OF THE EMBODIMENTS

The present disclosure will be described in detail below in conjunction with the drawings and embodiments, but the present application is not limited to these embodiments.

Figure 1:
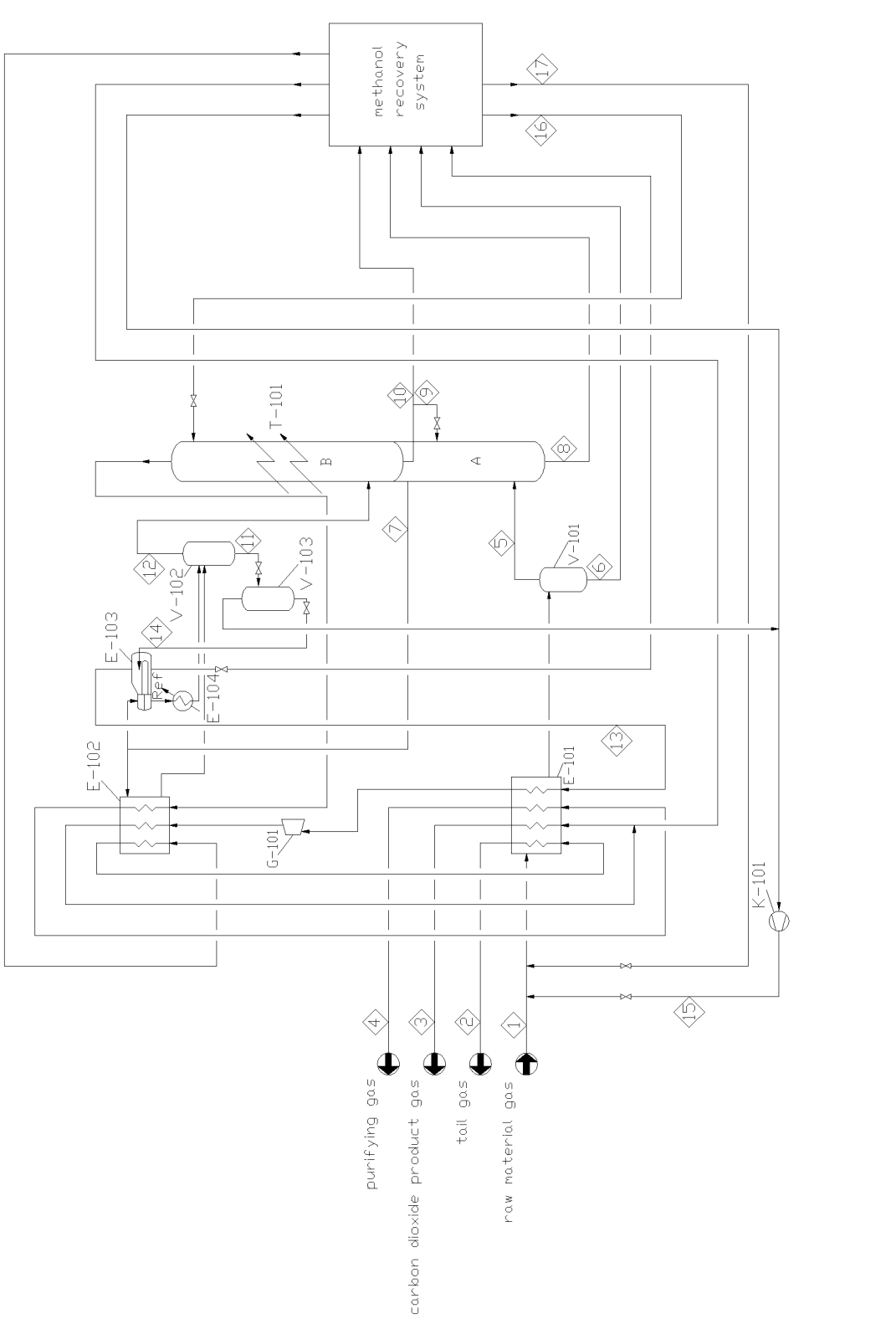
FIG. 1 is the structure and process schematic diagram of the device for washing and purification with a low-temperature methanol in one embodiment of the present application.

One embodiment of the present application provides a device for washing and purification with a low-temperature methanol. The structure of the device is shown in FIG. 1. The device includes a scrubber T-101, a heat exchange condensing device, a $CO_2$ condensate separator V-102, and an expander G-101.

A raw material gas pipeline is connected to a feed port of the $CO_2$ condensate separator V-102 through a pipeline, and the heat exchange condensing device is provided on the pipeline.

A gas outlet of the $CO_2$ condensate separator V-102 is connected to a lower part of the scrubber T-101 through a pipeline. A liquid outlet of the $CO_2$ condensate separator V-102 is connected to the heat exchange condensing device and the expander G-101 in sequence through pipelines.

A top of the scrubber T-101 is connected to the purified gas pipeline.

The heat exchange condensing device includes a purifying gas condenser E-102, a $CO_2$ condensate evaporator E-103, and a purified gas cryogenic device E-104.

The raw material gas pipeline is respectively connected to the heating chambers of the purified gas cryogenic device E-104 and the $CO_2$ condensate evaporator E-103.

The purified gas cryogenic device E-104 and the feed port of the $CO_2$ condensate separator V-102 are connected through a pipeline.

The heating chamber of the $CO_2$ condensate evaporator E-103 is connected to the feed port of the $CO_2$ condensate separator V-102 through a pipeline, and the purified gas cryogenic device E-104 is provided on the pipeline.

The liquid outlet of the $CO_2$ condensate separator V-102 is connected to an evaporation chamber of the $CO_2$ condensate evaporator E-103 and an inlet of the expander G-101 through pipelines in sequence.

Figure 2:
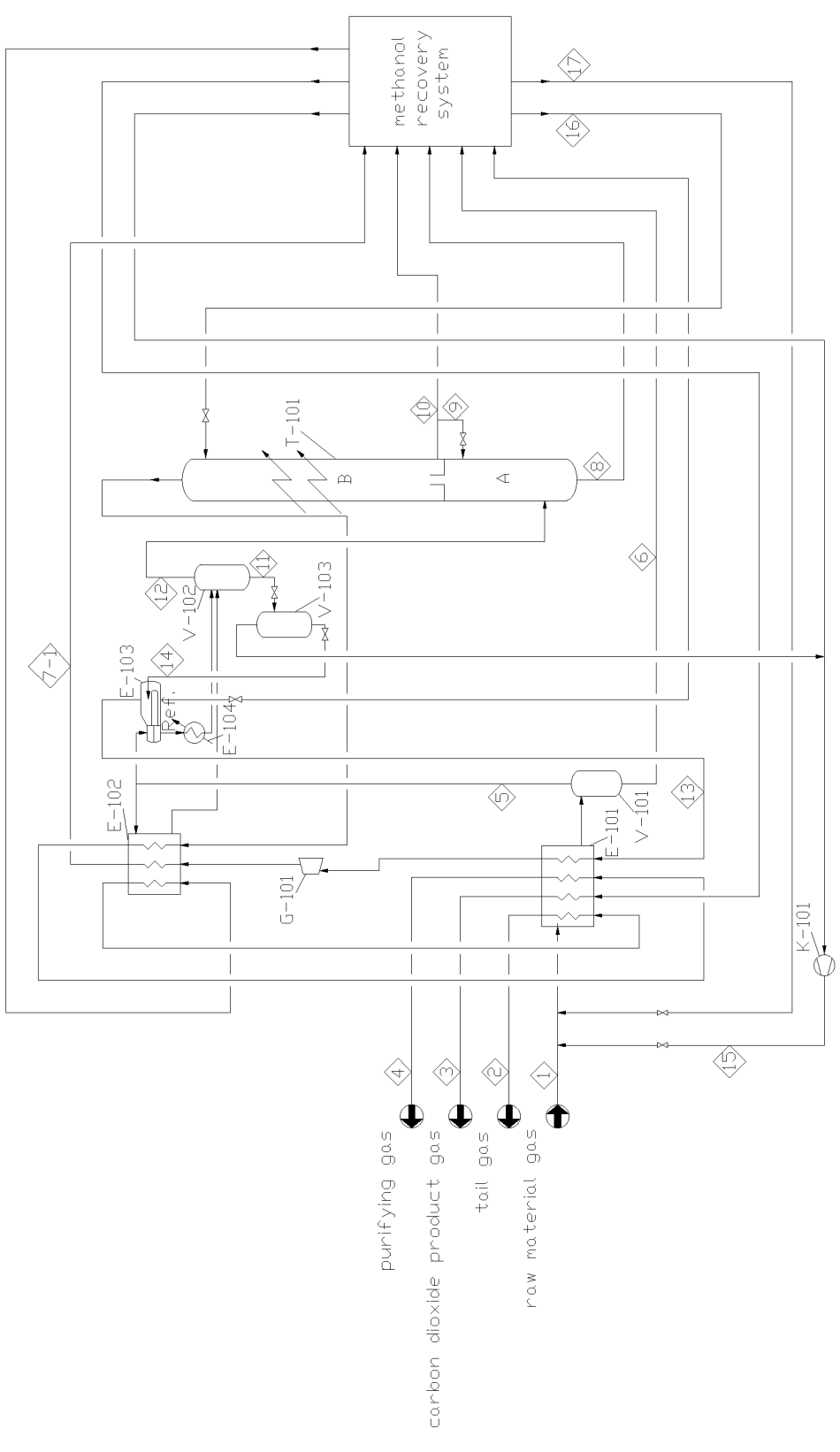
FIG. 2 is the structure and process schematic diagram of the device for washing and purification with a low-temperature methanol in the other embodiment of the present application.

The outlet of the expander G-101 is connected to a carbon dioxide product gas pipeline through the purifying gas condenser E-102. Or as another embodiment of the present application shown in FIG. 2, the outlet of the expander G-101 is connected to the carbon dioxide product gas pipeline through the purifying gas condenser E-102 and the recovery system sequentially.

The raw material gas pipeline is provided with a shift gas condenser E-101 and a shift gas separator V-101 in sequence along a direction of a gas flow.

The shift gas condenser E-101 is used to cool the raw shift gas.

The shift gas separator V-101 is used to separate methanol and water in the cooled raw shift gas.

The gas outlet of the shift gas separator V-101 is connected to the scrubber T-101 through a pipeline. Or as another embodiment of the present application shown in FIG. 2, the gas outlet of the shift gas separator is respectively connected to the purifying gas condenser and the $CO_2$ condensate evaporator through pipelines.

The liquid outlet of the shift gas separator V-101 is connected to the methanol recovery system through a pipeline.

The shift gas condenser E-101 is respectively located on the pipeline between the $CO_2$ condensate separator V-102 and the expander, on the carbon dioxide product gas pipeline, and on the purified gas pipeline.

The shift gas condenser E-101 is also located on the tail gas pipeline.

In an embodiment of the present application, as shown in FIG. 1, the scrubber T-101 includes a section A and a section B from bottom to top.

The section A of the scrubber T-101 is used to wash the gas separated by the $CO_2$ condensate separator V-102.

The section B of the scrubber T-101 is used to desulfurize the raw shift gas.

A lower part of the section A of the scrubber T-101 is connected to the gas outlet of the shift gas separator V-101 through a pipeline.

An upper part of the section A of the scrubber T-101 is connected to the heating chamber of the purifying gas condenser E-102 and the heating chamber of the $CO_2$ condensate evaporator E-103 through pipelines.

A lower part of the section B of the scrubber T-101 is connected to the gas outlet of the $CO_2$ condensate separator V-102 through a pipeline.

The gas outlet at a top of the section B of the scrubber is connected to the purified gas pipeline.

The device also includes a flash tank V-103.

The liquid inlet of the flash tank V-103 is connected to the liquid outlet of the $CO_2$ condensate separator V-102 through a pipeline.

The gas outlet of the flash tank V-103 is connected to the raw material gas pipeline.

The liquid outlet of the flash tank V-103 is connected to the evaporation chamber of the $CO_2$ condensate evaporator E-103 through a pipeline.

A compressor K-101 is provided on the pipeline connecting the flash tank V-103 and the raw material gas pipeline.

According to one embodiment of the present disclosure shown in FIG. 1, a method for washing and purification with a low-temperature methanol is as follows:

The raw shift gas for washing with a low-temperature methanol is cooled by the shift gas condenser E-101. The shift gas separator V-101 separates methanol and water to obtain the shift gas. After the methanol and water of the shift gas were separated by the shift gas separator V-101, the shift gas enters the section A of the scrubber T-101 and is desulfurized with some sulfur-free rich methanol. The sulfur-free raw material gas is guided out of the section A of the scrubber T-101 and then is cooled by the purifying gas condenser E-102, the $CO_2$ condensate evaporator E-103, and the heat exchanger E-104, where some $CO_2$ is condensed and enters the $CO_2$ condensate separator V-102 for separation. The gas obtained from the $CO_2$ condensate separator V-102 enters the section B of the scrubber T-101 and is washed with lean methanol until the $CO_2$ meets the requirements for the downstream process. Subsequently, the gas exchanges heat through the purifying gas condenser E-102 and the shift gas condenser E-101 and then was guided out of the boundary area. The high-pressure liquid $CO_2$ separated by the $CO_2$ condensate separator V-102 is decompressed and then flashed in the flash tank V-103 to obtain useful gas, which is compressed by the circulation gas compressor K-101 together with the medium-pressure flash gas and then returned to the raw material gas. The medium-pressure $CO_2$ liquid obtained from the flash tank V-103 is heat-exchanged and vaporized in the $CO_2$ condensate evaporator E-103, and the cooling capacity is recovered from the raw shift gas. The vaporized medium-pressure $CO_2$ gas is reheated by the shift gas condenser E-101 and then enters the expander G-101. The expander G-101 does external work to obtain the low-temperature and low-pressure $CO_2$ gas, which exchanges heat by the purifying gas condenser E-102 and then is combined with the $CO_2$ product gas of the system. After being exchanged heat by the shift gas condenser E-101, it is delivered out of the boundary area.

According to another embodiment of the present disclosure, a method for washing and purification with a low-temperature methanol is as follows:

The raw shift gas for washing with a low-temperature methanol is cooled by the shift gas condenser E-101. The shift gas separator V-101 separates methanol and water to obtain the shift gas. After the shift gas is cooled by the purifying gas condenser E-102, the $CO_2$ condensate evaporator E-103, and the heat exchanger E-104, some $CO_2$ is condensed and enters the $CO_2$ condensate separator V-102 for separation. The gas obtained from the $CO_2$ condensate separator V-102 enters the lower part of the section A of the scrubber T-101 for desulfurization. At this time, the section A and the section B of the scrubber T-101 are no longer separated, and the gas in the section A enters the section B through a chimney. The top of the scrubber T-101 is washed with lean methanol until the $CO_2$ meets the requirements for the downstream process. Subsequently, the gas exchanges heat through the purifying gas condenser E-102 and the shift gas condenser E-101 and then was guided out of the boundary area. The high-pressure liquid $CO_2$ separated by the $CO_2$ condensate separator V-102 is decompressed and then flashed in the flash tank V-103 to obtain useful gas, which is compressed by the circulation gas compressor K-101 together with the medium-pressure flash gas and then returned to the raw shift gas. The medium-pressure $CO_2$ liquid obtained from the flash tank V-103 is heat-exchanged and vaporized in the $CO_2$ condensate evaporator E-103, and the cooling capacity is recovered from the raw shift gas. The vaporized medium-pressure $CO_2$ gas is reheated by the shift gas condenser E-101 and then enters the expander G-101. The expander G-101 does external work to obtain the low-temperature and low-pressure sulfur-containing $CO_2$ gas (7-1), which exchanges heat by the purifying gas condenser E-102 and then enters the $CO_2$ desorption tower of the methanol recovery system for desulfurization. The obtained desulfurized $CO_2$ gas exchanges heat through the shift gas condenser E-101 and then is delivered to the boundary area as $CO_2$ product gas.

Example 1

A pressure 5.7 MPaG of a raw shift gas (1) including $H_2$ 53.60%, $CO_2$ 44.76%, $H_2S$ 0.15%, CO 0.97%, saturated water, and other components is mixed with a circulation gas (15) and spray lean methanol (17) and then enters the shift gas condenser E-101 to be cooled to −14° C. After methanol and water (6) are separated by the shift gas separator V-101, the separated shift gas (5) enters the section A of the scrubber T-101 to be desulfurized with sulfur-free rich methanol (9) for reflux. The sulfur content of the desulfurized purified gas (7) is less than 1 ppm. The desulfurized purified gas is guided out of the upper part of the section A of the scrubber T-101 and then is cooled to −32° C. via a heat change at the purifying gas condenser E-102, the $CO_2$ condensate evaporator E-103, and the purified gas cryogenic device E-104. After cooling down, a large amount of $CO_2$ in the desulfurized purified gas is condensed into the liquid, which is separated in the $CO_2$ condensate separator V-102. The purified gas (12) after the liquid separation returns to the section B of the scrubber T-101 to be washed with methanol until the $CO_2$ meets the purification requirements, thereby obtaining a purified gas (4).

The high-concentration $CO_2$ condensate (11) separated by the $CO_2$ condensate separator V-102 is flashed to obtain an effective gas such as $H_2$ in the flash tank V-103 after the pressure is reduced. The flash gas enters the circulation gas compressor K-101 to be compressed and then returns to the raw shift gas (1). The liquid phase in the flash tank V-103 (14) enters the $CO_2$ condensate evaporator E-103. The liquid $CO_2$ evaporates in the $CO_2$ condensate evaporator E-103 and provides cooling capacity for desulfurized purified gas. After evaporation, the obtained medium-pressure $CO_2$ gas (13) with a pressure of about 1.9 MPa exchanges heat via the shift gas condenser E-101 until reaching 30° C. before entering the expander G-101. The temperature of the $CO_2$ gas decreases by reducing the pressure with expansion and does external work to obtain a low-temperature $CO_2$ gas with a pressure of 0.38 MPaA and a temperature of −67° C. After heat exchanging with the purifying gas condenser of desulfurization E-102, the low-temperature $CO_2$ gas is mixed with the $CO_2$ gas obtained by a low-pressure flashing from the recovery system and re-heats to 30° C. by the shift gas condenser E-101 as a $CO_2$ product gas (3). The $CO_2$ product gas is then delivered out of the boundary area.

The methanol and water separated by the shift gas separator V-101, sulfur-containing rich methanol (8) obtained from the scrubber T-101, and sulfur-free rich methanol (10) are delivered to the methanol recovery system for recovery. The tail gas (2) of the system is discharged after heat exchanging with the purifying gas condenser of desulfurization E-102 and the shift gas condenser E-101.

Example 2

The conditions are the same as those in Example 1 except that the pressure is not reduced through an expansion after $CO_2$ is condensed.

Example 3

Comparing the energy consumption of the method of washing with a low-temperature methanol of Example 1 and that of Example 2, the results are as follows:

| | Process in Example 2 | Process in Example 1 |
|---|---|---|
| Conditions of raw shift gas | flow: 288579 $Nm^3/h$ temperature: 40° C. pressure: 5.7 MPaG content of $CO_2$: 44.76% mol | flow: 288579 $Nm^3/h$ temperature: 40° C. pressure: 5.7 MPaG content of $CO_2$: 44.76% mol |
| Indicators of main consumption | cooling capacity consumption (−38° C.): 4450 kW steam: 13.8 t/h nitrogen stripping: 12000 $Nm^3/h$ | cooling capacity consumption (−38° C.): 1715 kW steam: 12.8 t/h nitrogen stripping: 9800 $Nm^3/h$ |

-continued

|  | Process in Example 2 | Process in Example 1 |
|---|---|---|
| Scrubber diameter | 3800 mm | 3000 mm |

It can be seen from the above table that by combining the $CO_2$ condensation with the expander, the cooling capacity consumption of the process of washing with the low-temperature methanol is greatly reduced. The consumption of steam and the consumption of nitrogen stripping used in the process are also significantly reduced. At the same time, the diameter of the scrubber used to wash is also significantly reduced, which greatly reduces the production cost of the process of washing with a low-temperature methanol.

The above examples are only several embodiments of the present application and do not limit the present application in any form. Although the present application discloses several preferred embodiments as shown above, these embodiments do not used to limit the present application. Any professional familiar with the technique can make changes or modifications based on the above disclosure without departing from the scope of the technical solution of the present application, and these changes or modifications equal to equivalent embodiments and all belong to the scope of the technical solution.

What is claimed is:

1. A method for washing and purification with methanol, comprising:

condensing CO2 and a condensable gas from a raw shift gas and conducting a gas-liquid separation to obtain a $CO_2$-containing liquid and a separated raw material gas;

vaporizing the $CO_2$-containing liquid at a reduced pressure by an expansion to obtain a $CO_2$-containing gas; and washing the separated raw material gas with the methanol to obtain a purified gas.

2. The method according to claim 1, wherein the vaporizing the $CO_2$-containing liquid at the reduced pressure by the expansion comprises sub-steps of:

a. flashing the $CO_2$-containing liquid to obtain an effective gas and a flashed liquid phase, wherein the effective gas is compressed and returns to the raw shift gas;

b. evaporating the flashed liquid phase to obtain a $CO_2$-containing medium pressure gas; and c. delivering the $CO_2$-containing medium pressure gas into an expander at the reduced pressure to obtain the $CO_2$-containing gas;

before delivering the $CO_2$-containing medium pressure gas into the expander, the sub-step c further comprises:

performing a heat exchange and a heating to the $CO_2$-containing medium pressure gas.

3. The method according to claim 1, further comprising:

desulfurizing the $CO_2$-containing gas to obtain a desulfurized $CO_2$ gas;

the desulfurizing comprising:

delivering the $CO_2$-containing gas into a $CO_2$ desorption tower of a recovery system for a desulfurization to obtain the desulfurized $CO_2$ gas; and performing a heat exchange with the desulfurized $CO_2$ gas, wherein the desulfurized $CO_2$ gas serves as a $CO_2$ product gas and then is sent out of a boundary area.

\* \* \* \* \*